3,226,082
JOINT CONNECTION AND SEAL THEREFOR
Ronald A. Gulick, Sugar Land, and William E. Lowrey, Houston, Tex., assignors to ACF Industries, Incorporated, New York, N.Y., a corporation of New Jersey
Filed Mar. 22, 1965, Ser. No. 441,767
10 Claims. (Cl. 251—367)

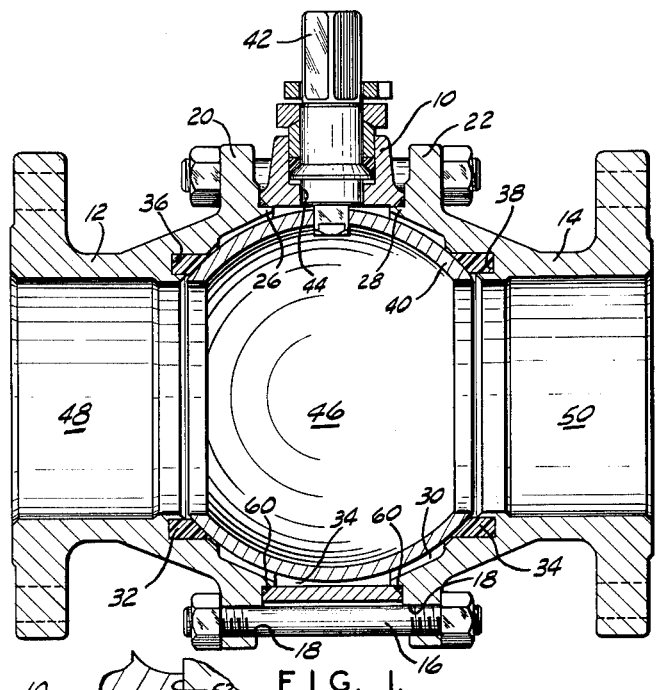
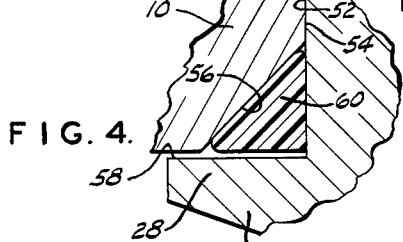
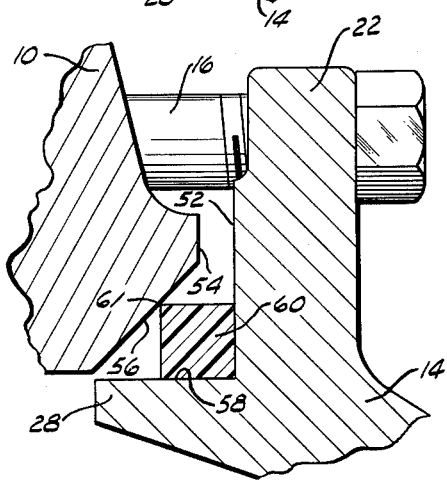
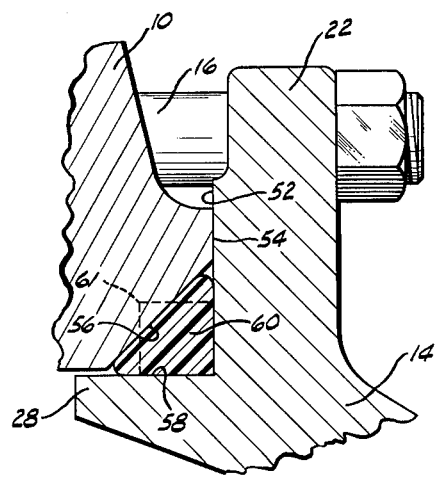
Dec. 28, 1965    R. A. GULICK ETAL    3,226,082
JOINT CONNECTION AND SEAL THEREFOR
Filed March 22, 1965
FIG. 1.
FIG. 2.
FIG. 3.
FIG. 4.
INVENTORS
RONALD A. GULICK
WILLIAM E. LOWREY
BY James Jackson
AGENT

United States Patent Office 3,226,082
Patented Dec. 28, 1965

This application is a continuation-in-part of our copending application Serial No. 199,932, filed June 4, 1962, now abandoned, entitled Joint Connection and Seal Therefor.

This invention relates generally to valves, and more particularly to the development of a fluidtight seal between the various valve housing sections which, when assembled, define the body portion of a valve.

The body of a valve which might be an end entry ball valve as illustrated in the drawings, for example, may be comprised of a central valve housing to which one or more end members are detachably connected. Since the joint between the central valve housing and the end member is exposed, at least at times, to the pressure of the fluid flowing through the valve, it is necessary to provide a seal which will prevent escape of the pressurized fluid to the atmosphere. One common means of providing such a seal has been the utilization of a gasket of deformable material which is positioned in a seal pocket provided in the joint. The gasket is customarily deformed by direct pressure between the two members establishing a seal to prevent leakage through the joint. Unless there is care in tolerancing and machining of the various elements, the gasket may be too large for the pocket and cause a standoff between the central valve housing and end member. In some instances this is undesirable, since certain types of fluid may require a metal-to-metal seal in addition to a seal produced by a gasket of deformable material. On the other hand, if there is not maintained sufficient load producing interference between the gasket and sealing surfaces, a leak path can develop, especially since seals produced by directly pressurized gaskets are not generally pressure acting within themeselves. Moreover, as the gasket of prior art devices is frequently permanently crushed during installation, a new gasket is usually required each time the joint is disassembled. The use of a deformable gasket has required careful balancing of dimensions to provide a satisfactory seal in all instances. This practice tends to increase the overall cost of manufacture.

The principal object of the present invention is to provide a novel economical, leakproof, non-standoff joint for the joined sections of a valve body utilizing a seal ring of deformable material.

It is another object of this invention to provide a novel seal ring of deformable material which is movable by the pressurized fluid controlled by the valve to increase the sealing ability of the seal.

It is a further object of this invention to provide a novel pressure actuatable reuseable seal ring of deformable plastic material to establish an economical, leakproof, nonstandoff seal between the central body section and end member of a ball valve.

In order to accomplish the above objects and other objects which will become apparent from the following detailed description, the joint between the central valve housing and the end member of the present invention is provided with an annular seal pocket which has one outer wall angularly inclined. A seal ring composed of deformable plastic or soft metal material is placed within the pocket defined by the housing and end member and is deformed from an originally square cross-sectional shape into a generally triangular cross-sectional shape. The seal ring and pocket are so relatively proportioned that the joint may be brought into metal-to-metal contact without the seal ring overflowing the pocket or restricting such full engagement. Since the annular seat pocket is triangular in cross section and the initially square seal ring is deformed on assembly into a generally triangular shape, there will be developed an extremely high compression in the plastic or soft metal from which the seal ring is composed, causing the material to flow into and to fill minute surface imperfections, thereby establishing an extremely high pressure seal. The seal is considered pressure actuated since the outer wall of the pocket is angularly inclined and pressure on the seal ring will tend to force it into the decreasing space defined by an apex of the triangular pocket, thereby increasing the magnitude of the seal in direct proportion with the pressure within the valve.

Other and further objects of the invention will become obvious upon an understanding of the illustrative embodiments about to be described, or will be indicated in the appended claims, and various advantages not referred to herein will occur to one skilled in the art upon employment of the invention in practice.

A preferred embodiment of the invention has been chosen for purpose of illustration and description and is shown in the accompanying drawings, forming a part of the specification, wherein;

FIGURE 1 is a sectional view taken in elevation of a ball valve incorporating the novel joint construction of the present invention.

FIGURE 2 is an enlarged fragmentary sectional view of the valve of FIGURE 1, illustrating the novel joint construction in detail.

FIGURE 3 is an enlarged fragmentary sectional view of the valve of FIGURE 1 illustrating assembly of the joint.

FIGURE 4 is an enlarged fragmentary sectional view of the valve of FIGURE 1 illustrating pressure actuation of the sealing member.

Referring now to FIGURE 1 of the drawings, an end entry ball valve constructed in accordance with the present invention, is comprised generally of a central generally cylindrical valve housing 10. A pair of end members 12 and 14 are connected in sealing relation to the valve housing 10 by a series of bolts 16 which extend through apertures 18 formed in flanges 20 and 22 of the end members 12 and 14 respectively. The valve housing 10 is provided with a cylindrical bore 22, which receives a pair of flanges 26 and 28, formed respectively on the end members 12 and 14 in relatively loose fitting relation therein. The end members 12 and 14 cooperate with the central valve housing 10 to define a generally spherical valve chamber 30. A pair of sealing members 32 and 34 are disposed respectively within circular seat recesses 36 and 38 formed in the end members 12 and 114. A generally spherical plug member 40 is positioned within the valve chamber 30 with its exterior spherical surface in sealing engagement with the seal members 32 and 34, and is rotatable between open and closed positions by a valve stem 42, extending through an aperture 44 in the valve housing 10. The spherical plug member 40 is provided with a through passage 46, which is alignable in the open position with inlet and outlet passages 48 and 50 formed respectively in the end members 12 and 14, to allow the flow of fluid through the valve. When rotated 90° to the closed position, the plug member 40 blocks the flow of fluid through the flow passages 48 and 50.

As illustrated in detail in FIGURES 2–4, each of the flanges 20 and 22 has a substantially planar annular surface 52 formed thereon and disposed in generally normal relationship with the common axes of the inlet and outlet passages 48 and 50. The central housing 10 is provided with a pair of annular substantially planar surfaces 54 defining the axial ends of the housing, which abut the surfaces 52 to limit entry of the end members into the valve housing 10. By so limiting the entry of the end members into the central housing, the amount of deformation of the seat members 32 and 34 can be accurately controlled to maintain a predetermined degree of interference between the seal members 32 and 34 and the spherical plug, thereby maintaining the torque required to rotate the valve member at a desired minimum level. The mating surfaces 52 and 54 on the end members and housing may be accurately finished to provide a metal-to-metal seal to serve as a secondary seal in the event that the primary seal is lost as a result of deterioration of the seal member by excessive heat or chemical action. Referring now particularly to FIGURES 2 and 3 of the drawings, and forming an important part of this invention, the valve housing 10 is provided with a frusto-conical surface 56 at each end thereof intersecting the planar surfaces 54, which cooperate with the planar surfaces 52 of the flange 20 and 22 and with substantially cylindrical exterior peripheral surfaces 58 formed on the annular flanges 28, to define annular seal pockets of generally triangular cross section.

Disposed within each of the generally triangular cross-sectioned seal pockets is an annular seal ring 60, of originally square cross section which is deformed between the surfaces 56, 58 and 52 upon assembly to the triangular shape of the seal pocket.

As previously mentioned, if the gasket of prior art design is too large for the seal pocket, there will occur a condition of standoff between the end 54 of the housing 10 and the surface 52 of the flange 20, thereby preventing the occurrence of a metal-to-metal seal between the housing and the flange. Moreover, if a condition of standoff occurs between the surfaces 52 and 54, the proper amount of deformation of the seal member 32 and 34 will not be possible, and the resulting interference between the seal members and the spherical surface of the plug member 40 cannot be accurately determined. On the other hand, if the gasket does not completely fill the pocket of these prior art devices, there is a possibility that a leak will develop since there will be insufficient load producing interference between the seal ring and the surfaces to be joined. In order to eliminate the delicate balancing of tolerances it has been found that utilizing a pocket which is triangular in cross section and deforming an initially square plastic or soft metal seal ring into the triangular pocket in the manner disclosed herein, will result in a satisfactory seal without the precise tolerancing required in prior art joints.

The seal ring 60 is of less cross-sectional area than the cross-sectional area of the seal pocket, thereby allowing the seal ring 60 to be completely compressed within the seal pocket without the possibility of causing a standoff between the surfaces 52 and 54, as described hereinabove.

The seal ring 60 is originally deformed from its initial square cross section to a subsequent triangular cross section to achieve an initial seal between the valve housing and end members, and when the valve is under pressure the seal rings 60 will be pressure actuated by the pressurized fluid within the valve. Pressurized fluid within the valve enters the seal pocket between the flange 28 and the valve housing (FIGURE 4) and acts on the lower portion of the triangular seal 60, attempting to force the seal 60 outwardly of the seal pocket. This in effect causes the seal 60 to be expanded radially into the apex defined by the intersecting walls 56 and 52 of the seal pocket and results in an increase in the interference between the seal 60 and the walls 56 and 52. Radial or "hoop" expansion of the seal ring 60 causes an increase in the magnitude of the seal developed between the valve housing and the end members which is directly proportional to the increase in pressure. The circular seal ring 60, therefore, is subjected to tensile or "hoop" deformation by the forces produced by the pressurized lading attempting to force the seal 60 toward the outer apex of the triangular seat pocket and the seal ring being resilient will retract from the FIGURE 4 condition to the FIGURE 3 condition upon a reduction in the pressure within the valve.

The seal ring 60 may be fabricated of a number of different acceptable materials depending upon their resistance to chemical action, radiation, temperature, pressure, etc., with the only requirement that the materials, to be acceptable, must be of 40 or harder when measured according to the Durometer D scale of hardness. A material, to be considered acceptable, must not have the qualities of an elastomeric material because the magnitude of seal developed at the area of maximum distortion (the outer corner 61 of the seal ring) would not ordinarily be great enough to be acceptable. Some of the available materials which are acceptable sealing materials and which have superior resistance to chemical action are polytetrafluoroethylene, manufactured under the trademark "Teflon" by the E. I. du Pont de Nemours & Company, and polychlorotrifluoroethylene, manufactured under its trademark "Kel-F" by the Minnesota Mining and Manufacturing Corporation. A number of other suitable plasticlike materials can be employed as sealing members, depending upon the design requirements of the valve.

Where resistance to chemical action is not a consideration and where extremely high fluid pressures are involved, the sealing ring may be formed of a metal. The only requirement for the metal of the sealing ring is that it be softer than the metal which defines the seal chamber.

One essential advantage that the present invention has over prior art joints utilizing gaskets of deformable material lineally compressed into a pocket, is that a greater accumulated tolerance condition will still provide a satisfactory seal. The reason for this is that the action of deforming the initially square sealing ring 60 into a generally triangular shape will yield a satisfactory seal at acceptable assembly loads due to the fact that the crushing of the seal ring 60 takes place from an outer peripheral corner of the seal ring, thereby geometrically allowing a greater lineal length of movement and acceptable tolerances before excessive seal ring loads are encountered. In direct compression type square gaskets, which have been customarily used for this type of joint construction, the entire projected area of the gasket must be initially yielded to effect a seal. Therefore, the assembly loads become rather high with very small lineal movement and tolerances are materially restricted if a secondary metal-to-metal contact is required. In the present invention, as illustrated in FIGURE 2, the sealing surface contact impinging on the square section seal ring is disposed in angular relation to the annular and radial surfaces of the seal ring, and initially contacts the outer peripheral corner of the seal ring 60. On initial contact the outer line edge or corner 61 of the seal ring 60 will establish a line of contact with the frusto-conical surface 56. Initially, the amount of compression between the seal ring and the surface 56 approaches infinity, therefore, starting deformation for the development of an initial seal at very minor assembly loads. Due to the geometry of the square ring 60 being deformed from the corner by the frusto-conical surface 56, a material greater lineal distance producing broad lineal tolerances of the overall assembly results before a bearing equivalent to initial bearing area of an initial prior art gasket is reached. Hence, a greater lineal movement is possible, allowing increased manufacturing tolerances and generally resulting in lower cost. Not only are greater lineal tolerances achieved, but also broader surface finish tolerances can be tolerated because at initial contact the exceptionally high bearing stresses more efficiently cause the sealing material to flow into any surface irregularities since the high loads are sufficient to actually flow the plastic or soft metallic material.

The proportions of the seal ring 60 and the seal pocket are such that the maximum cross-sectional area of the initially square seal ring 60 is always less than the minimum cross-sectional area of the pocket, as defined when the surfaces 52 and 54 of the valve housing and end members are brought into intimate contact. The minimum lineal tolerance is set so that when the effective lineal length of the seal ring 22 is minimum and the location of the angular sealing surface 56 from the end wall 52 of the pocket is maximum in assembly, the angular sealing surface will have compressed the lineal length of the seal ring 60 at least 10 percent. It has been found that movement of the surfaces 52 and 54 at least 10 percent of the length of the seal member 60, after initial contact is made between the surface 56 and the seal ring, displaces a sufficient volume of the seal material and causes sealing interference of sufficient magnitude to achieve a positive seal over substantially the entire surface area of the frusto-conical surface 56.

Another decided advantage produced by the instant invention involves direct lineal movement of the end members into engagement with the sealing members. Since the end members are drawn into assembly with the body lineally by the bolts 16, there will be a tendency developed for the sealing material to flow directly into the surface imperfections of the surfaces defining the seal pocket to develop a fluidtight seal therebetween. If the metal surfaces were rotated relative to the sealing member upon assembly of the valve, there would occur a tendency for erosion of the sealing material by the surface irregularities of the metal surfaces, thereby reducing the efficiency of the seal and possibly rendering the seal ineffective.

The assembly procedure for assembling the end members 12 and 14 to the valve housing 10 involves an initial positioning of the seal member 60 about the cylindrical surface 58 of the end member flange 28. The fit between the inner periphery of the seal member 60 and the cylindrical surface 58 may vary from a close sliding fit to a loose fit, depending upon the stack-up of tolerances involved between these two parts. At no time, however, is there contemplated an extremely tight fit between the cylindrical surface 58 and the inner periphery of the seal member 60. The end member and the housing may be moved easily toward one another until engagement between the surface 56 of the housing 10 and the outer corner 61 of the seal member 60 occurs. The housing and end members are then forcibly drawn together by the bolts 16 and upon being drawn together cause deformation of the seal member 60 from its originally square cross section, as illustrated in FIGURE 2, to the generally triangular cross section illustrated in FIGURE 3. In being deformed from its original cross section to a generally triangular cross section, the seal member 60 will establish an extremely high pressure seal between the surfaces 52, 56 and 58, defining the triangular cross-sectioned seal pocket, thereby preventing any escape of pressurized fluid through the joint between the housing and end members.

An important feature of this invention involves the specific shape of the seal pocket relative to the initial and subsequent shape of the seal member 60. As viewed in cross section, the surface 52 on the flange 20 and the cylindrical surface 58 on the flange 28 are disposed generally in right angular relationship one with the other. The frusto-conical surface 56 is generally disposed in 45° relationship with both of the surfaces 52 and 58, and define an annular seal pocket of substantially right triangular proportion. Since the cross-sectional shape of the seal member 60 is initially square, the inner peripheral surface of the seal member and a radial surface of the seat 60 will be supported by the surfaces 58 and 52 respectively. In view of the correspondence between the seal 60 and the supporting flanges 52 and 58 on the end member 14, the deformation of the inner peripheral and radial surfaces of the seal member 60 will be extremely slight, amounting only to slight flowing of the material from which the seal is composed into the minor surface irregularities of the respective surfaces 52 and 58. This, of course, allows maximum deformation of the corner 61 of the seal 60, thereby allowing maximum lineal movement of the housing 10 and end member 14 toward one another during the assembly process of the valve. The specific relationship, therefore, between the initial cross-sectional shape of the seal member 60 and the subsequent compressed cross-sectional shape thereof, as compared to the FIGURE 2 cross-sectional shape of the seal pocket 60 allows substantially all of the deformation of the seal member 60 to take place at the outer corner 61 thereof, as indicated hereinabove. This direct compression effectively prevents the development of undesirable stresses within the seal member 60 and assures maintenance of the maximum resiliency of the material from which the seal 60 is composed. Overstressing, if developed within the seal members 60, could cause portions of the seal material to take a set and lose their resilience.

While the joint connection described above and illustrated in the drawings is generally directed to a spherical plug valve, this specific valve construction is not intended as limiting in regard to the invention. Use of the invention in other connection applications, such as for the establishment of a seal between the bonnet and body of a gate valve for example, is contemplated and is deemed as falling within the spirit and scope of the invention.

As can be seen from the foregoing, by utilizing the present invention an effective seal will result over wide tolerance ranges and the seal ring can be so proportioned that there is no possibility of restricting full contact between the end of the body section and its mating flange surface, yet at the same time assuring an effective seal.

As various changes may be made in the form, construction and arrangements of the parts herein without departing from the spirit and scope of the invention, and without sacrificing any of its advantages, it is to be understood that all matter herein is to be interpreted as illustrative and not in a limiting sense.

We claim:

1. A valve comprising a body having a central bore and having an internal frusto-conical surface at each end thereof, a pair of end members each having an annular rim being slightly smaller than said bore establishing a clearance therebetween, said rim entering the bore and having a radial flange disposed generally normal to the annular rim which contacts the end of the housing to limit the amount of entry of the annular rim into said bore, means for moving the end members linearly along a common axis to bring the radial flange and the end of the housing into intimate sealing contact, an annular pocket of generally triangular cross section defined at each end of the body by cooperation of the frusto-conical surface of the body with the rim and the radial flange of each end member, a deformable sealing ring of initially square cross section disposed within each of the pockets, each of said frusto-conical surfaces initially contacting an outer circumferential corner of the sealing ring and deforming the seal ring to a generally triangular cross sectional shape as the end members are moved linearly into assembly with the body, thereby establishing seals between the body and end members which are adapted upon an increase in pressure within the valve which is in communication with said seal through said clearance to cause an increase in the compression of said seal, each of the sealing rings having a maximum cross-sectional area less than the minimum cross-sectional area of the respective pocket and a minimum lineal length so that the frusto-conical surface in assembled condition will compress the lineal length of the sealing ring at least ten percent.

2. A valve comprising a body having a central bore and having an inwardly converging internal frusto-conical surface at each end thereof, a pair of end members each having an annular rim being slightly smaller than said bore establishing a clearance therebetween, said rim entering the bore and having a radial flange disposed generally normal to the annular rim which contacts the end of the housing to limit the amount of entry of the annular rim into said bore, means for moving the end members linearly along a common axis to bring the radial flange and the end of the housing into intimate sealing contact, an annular pocket of generally triangular cross section defined at each end of the body by cooperation of the frusto-conical surface of the body with the rim and the radial flange of each end member, a deformable sealing ring of initially square cross section disposed within each of the pockets, said sealing ring being in the range of 40 or harder when measured on the Durometer scale, each of said frusto-conical surfaces initially contacting an outer circumferential corner of the sealing ring and deforming the seal ring to a generally triangular cross-sectional shape as the end members are moved linearly into assembly with the body, thereby establishing seals between the body and end members which are adapted upon an increase in pressure within the valve which is in communication with said seal through said clearance to cause an increase in the compression of said seal, each of the sealing rings having a maximum cross-sectional area essentially equal to the minimum cross-sectional area of the respective pocket and a minimum lineal length so that the frusto-conical surface in assembled condition will compress the lineal length of the sealing ring at least ten percent, said radial and annular rim supporting radial and annular surfaces of said seal member whereby substantially all of the deformation of the sealing ring will occur at said outer circumferential corner of the seal ring and said radial and annular surfaces of said sealing ring will be substantially free from distortion.

3. A valve comprising an annular body member having opposing internal frusto-conical surfaces formed thereon, a pair of end members adapted for connection to the valve body to define a valve chamber and having a pair of flow passages, a valve member movably disposed within the valve chamber, means for moving the valve member, each of the end members having an annular axial flange thereon defining a substantially cylindrical rim being slightly smaller than the internal dimension of the annular body member and interfitting with the valve body to orient the end members in coaxial relation with the body member, each of the end members having a radial flange thereon defining a substantially planar radial surface disposed generally normal to the rim and adapted for intimate sealing engagement with the planar end surface of the body, said frusto-conical surfaces cooperating with the rim and radial surfaces of each of said end members to define a pair of annular seat pockets of generally right triangular cross section, an annular plastic sealing member of initial square cross section disposed one within each of the annular pockets, means for moving the end members linearly along a common axis to cause deformation of the sealing member to a generally triangular cross section and for clamping the end members to the body member, said sealing members having a maximum cross-sectional area less than the cross-sectional area of the annular pockets in assembled condition and a minimum lineal length so that the frusto-conical surfaces in assembled condition will compress the lineal length of the sealing members at least 10 percent, said sealing members being adapted upon an increase in pressure of the fluid controlled by the valve to cause an increase in compressive value of the seal between the body and end members.

4. A valve comprising an annular body member having opposing internal frusto-conical surfaces formed thereon, a pair of end members adapted for connection to the valve body to define a valve chamber and having a pair of flow passages, a valve member movably disposed within the valve chamber, means for moving the valve member, each of the end members having an annular axial flange thereon defining a substantially cylindrical rim being slightly smaller than the internal dimension of the annular body member and interfitting with the valve body to orient the end members in coaxial relation with the body member, each of the end members having a radial flange thereon defining a substantially planar radial surface disposed generally normal to the rim and adapted for intimate sealing engagement with the planar end surface of the body, said frusto-conical surfaces cooperating with the rim and radial surfaces of each of said end members to define a pair of annular seat pockets of generally right triangular cross section, an annular soft metal sealing member of initial square cross section disposed one within each of the annular pockets, means for moving the end members linearly along a common axis to cause deformation of the sealing member to a generally triangular cross section and for clamping the end members to the body member, said sealing members having a maximum cross-sectional area less than the cross-sectional area of the annular pockets in assembled condition and a minimum lineal length so that the frusto-conical surfaces in assembled condition will compress the lineal length of the sealing member at least 10 percent, said sealing members being movable by pressure within the valve toward an apex of the respective triangular seal pocket, thereby causing an increase or decrease in the compression of the sealing members in direct proportion to the pressure fluctuations within the valve.

5. A valve comprising an annular body member having opposing internal frusto-conical surfaces formed thereon, a pair of end members adapted for connection to the valve body to define a valve chamber and having a pair of flow passages, a valve member movably disposed within the valve chamber, means for moving the valve member, each of the end members having an annular axial flange thereon defining a substantially cylindrical rim being slightly smaller than the internal dimension of the annular body member and interfitting with the valve body to orient the end members in coaxial relation with the body member, each of the end members having a radial flange thereon defining a substantially planar radial surface disposed generally normal to the rim and adapted for intimate sealing engagement with the planar end surface of the body, said frusto-conical surfaces cooperating with the rim and radial surfaces of each of said end members to define a pair of annular seat pockets of generally right triangular cross section, an annular sealing member of 40 or harder when measured on the Durometer D scale and of initial square cross section being disposed one within each of the annular pockets, means for moving the end members linearly along a common axis to cause deformation of the sealing member to a generally triangular cross section and for clamping the end members to the body member, said sealing members having a maximum cross-sectional area less than the cross-sectional area of the annular pockets in assembled condition and a minimum lineal length so that the frusto-conical surfaces in assembled condition will compress the lineal length of the sealing member at least 10 percent, said sealing members being adapted upon an increase in pressure of the fluid controlled by the valve to cause an increase in compressive value of the seal between the body and end members, the inner peripheral surface and one of the radial surfaces of each sealing member being supported respectively by the annular rim and radial surface of the associated end member whereby substantially all of the deformation of the sealing member will occur at an outer circumferential corner of the sealing member.

6. A joint construction comprising a member having a substantially planar annular surface and a substantially cylindrical surface disposed substantially normal to said annular surface and defining an annular groove therewith, a closure member having an exterior cylindrical surface of slightly smaller diameter than said cylindrical surface and, fitting within the cylindrical surface, in such a manner as to define a clearance therebetween, said closure member having a frusto-conical surface thereon which cooperates with the planar and annular walls to define an annular seal chamber having a right triangular cross section, a seal ring having an initially square cross section disposed within the seal chamber, the seal ring having a cross-sectional area less than the cross-sectional area of the seal chamber, the closure member upon assembly being in abutment with the planar surface, means for retaining the closure member in abutment with the planar surface, the sealing member being deformed at one corner thereof to a frusto-conical configuration and being supported against substantial deformation by the planar and cylindrical walls, the seal ring establishing a fluidtight seal between the member and the closure and adapted to react under fluid pressure for increasing the magnitude of said seal in direct proportion to fluid pressure in communication therewith through said clearance applied thereto.

7. A joint construction as set forth in claim 6, said seal ring being of 40 or harder when measured according to the Durometer D scale and being softer than the material from which the member and closure are composed.

8. A joint construction as set forth in claim 7, said seal ring being composed of a soft metal.

9. A joint construction as set forth in claim 7, said seal ring being composed of a plastic material.

10. A joint connection comprising first and second members interfitting in abutting relation to define an annular seal chamber of triangular cross section, a clearance between a portion of said abutting members for establishing fluid communication with said seal chamber, a seal ring of initially square cross section disposed within the annular chamber and being deformed by one of the members into a triangular cross section to develop a fluid-tight seal between said members, the seal ring having a hardness of 40 or harder when measured on the Durometer D scale, being of less hardness than that of said members and being inelastic, the seal ring being distorted at least 10 percent of its cross-sectional length upon movement of the members into abutment, the seal ring being movable under fluid pressure introduced into said seal chamber through said clearance to increase the magnitude of the seal in direct proportion to the increase in pressure applied thereto.

References Cited by the Examiner

UNITED STATES PATENTS

| | | | |
|---|---|---|---|
| 2,343,235 | 2/1944 | Bashark. | |
| 3,030,068 | 4/1962 | Priese | 251—317 X |
| 3,056,576 | 10/1962 | Kulisek | 251—317 X |

M. CARY NELSON, *Primary Examiner.*